United States Patent
Casteres et al.

(10) Patent No.: US 8,468,006 B2
(45) Date of Patent: Jun. 18, 2013

(54) METHOD OF COMBINED SIMULATION OF THE SOFTWARE AND HARDWARE PARTS OF A COMPUTER SYSTEM, AND ASSOCIATED SYSTEM

(75) Inventors: Jean Casteres, Toulouse (FR); Mikael Castor, Rennes (FR)

(73) Assignee: Airbus Operations S.A.S., Toulouse (FR)

( * ) Notice: Subject to any disclaimer, the term of this patent is extended or adjusted under 35 U.S.C. 154(b) by 527 days.

(21) Appl. No.: 12/763,473

(22) Filed: Apr. 20, 2010

(65) Prior Publication Data
US 2010/0332209 A1 Dec. 30, 2010

(30) Foreign Application Priority Data
Jun. 24, 2009 (FR) .................................. 09 54308

(51) Int. Cl.
*G06F 9/445* (2006.01)
*G06F 9/455* (2006.01)
(52) U.S. Cl.
USPC ............... 703/21; 703/22; 370/312; 370/320; 370/329; 709/240; 712/216
(58) Field of Classification Search
USPC ........ 703/21, 22; 370/312, 329, 406; 712/216
See application file for complete search history.

(56) References Cited

U.S. PATENT DOCUMENTS

| | | | | |
|---|---|---|---|---|
| 5,754,812 | A * | 5/1998 | Favor et al. ............... | 712/216 |
| 6,542,511 | B1 * | 4/2003 | Livermore et al. ............ | 370/406 |
| 7,321,940 | B1 * | 1/2008 | Smith et al. ................ | 709/240 |
| 7,596,113 | B1 * | 9/2009 | Kingston et al. ............. | 370/320 |
| 2008/0130569 | A1 * | 6/2008 | Nanda ........................ | 370/329 |
| 2009/0262676 | A1 * | 10/2009 | Labbe et al. ................ | 370/312 |

FOREIGN PATENT DOCUMENTS

| | | |
|---|---|---|
| WO | WO 99/49393 | 9/1999 |
| WO | WO 2006/094047 A2 | 9/2006 |
| WO | WO 2006/094047 A3 | 9/2006 |

OTHER PUBLICATIONS

Jean Casteres et al., "Aircraft integration real-time simulator Modeling with AADL for architecture tradeoffs", Design, Automation & Test in Europe Conference & Exhibition, XP 031477800, Apr. 20, 2009, pp. 346-351.

Mikael Castor, "Modelisation et simulation de l'Architecture des simulateurs avion pour la mesure de performance Technical Report", http://beru.univ-brest.fr/{singhoff/cheddar/contribs/examples_of_use/airbus/mickael_castor/Rapport_Stage_Rapid_Protyping_Public.pdf>, XP 007911129, (creation date Sep. 12, 2007, publication date unknown), 44pages.

\* cited by examiner

*Primary Examiner* — Thai Phan
(74) *Attorney, Agent, or Firm* — Oblon, Spivak, McClelland, Maier & Neustadt, L.L.P.

(57) ABSTRACT

This invention relates to a method for simulation of a computer system (10), for example for an aeronautical simulation application, comprising a hardware infrastructure (HW) and a software portion (SW).

The method comprises:
- the modeling (E100) of the said hardware infrastructure (HW) in a plurality of schedulers (11-14) capable of simulating the successive execution of tasks (15, 40, 40'),
- the modeling (E110) of the said software portion (SW) in a plurality of initial tasks (15) comprising accesses to resources of the said hardware infrastructure (HW),
- the simulation (E130) of the initial tasks (15) comprising the software propagation of simulated accesses through schedulers (11-14) of the said modeled infrastructure (HW),
- the said propagation being carried out in the form of transactions (50) between pairs of schedulers (11-14), a transaction (50) comprising a task (40, 40') on each scheduler and an indication of precedence (40") linking the two tasks (40, 40').

14 Claims, 6 Drawing Sheets

METHOD OF COMBINED SIMULATION OF THE SOFTWARE AND HARDWARE PARTS OF A COMPUTER SYSTEM, AND ASSOCIATED SYSTEM

This invention relates to a method for simulation of a computer system, in particular of a computer system for the simulation of aeronautical systems, and relates to a corresponding simulation system.

Simulation became widespread during the last few decades so as to reduce the development costs of software or hardware projects.

In the aeronautical field, a new aircraft architecture is developed by simulating all or part of the equipment items making up this architecture.

To accomplish this, a computer simulation unit, also called "simulation host," comprises simulation software models the execution of which reproduces, for each one, the functions of an equipment item of the on-board architecture. This simulation unit is interfaced with real equipment items of the architecture and as development advances, the software models used are replaced by the corresponding real equipment items to result in a wholly real prototype.

The simulation unit generally is a computer platform having several central processing units (CPU), memories and input/output interfaces with the real equipment items.

The stored software models are executed on these CPU units in order to reproduce the functions of the simulated equipment items. These models communicate among themselves and with the real equipment items so as to best simulate the real-time performance of the architecture in the process of being developed.

One has been led to rethink the hardware infrastructure (CPU, memory, bus, input/output interfaces, etc.) of the simulation host because of the discontinuation of manufacture of certain components used until then, and because of the increasing demand for resources by the simulation models.

In this context, there has been need to identify and to develop a new hardware infrastructure for the simulation host adapted to the software needs for simulation, so as to satisfy the real-time execution of the simulation prototype. And in particular, it seemed useful to determine the minimal performances that the hardware infrastructure must verify in order to guarantee this real-time execution.

By "real time" there is understood here the fact that a service or a task rendered during execution is rendered in an allowed time. This allowed time generally corresponds to the maximal time provided for this task so as not to compromise the functioning of the rest of the real-time architecture. The simulation prototype satisfies the real-time constraints if its models and real equipment items as a whole also satisfy them.

This development of the new infrastructure of the simulation host naturally requires computer simulation in order to verify the satisfaction of these real-time constraints.

Description languages for electronic circuits, such as the HDL or VHDL ("Very high speed integrated circuit Hardware Description Language") language are known. These make it possible also to produce a description of the hardware architecture, which then is executed on a standard computer for logical electric simulation.

This execution of the hardware description generally is coupled with the execution of a software program to verify the compatibility between them. In this context, the document U.S. Pat. No. 6,223,144 proposes testing, with a view to debugging, the execution of a microcontroller program on a simulated hardware architecture prior to production of a component intended to accommodate this microcontroller.

This solution, however, is not dedicated to the determination of real-time performances of the hardware architecture, or to the execution of a plurality of software programs such as the simulation models referred to above and executed at the same time.

There also is known the modeling language AADL ("Architecture Analysis & Design Language") with which a simulation application architecture is modeled. This modeling represents the system architecture in a set of separate software and hardware components, and interactions between these components, so as to analyze the real-time execution performances of the modeled simulation application.

This analysis relies in particular on the use of a scheduler, also called "scheduler," associated with the model of the processor for the infrastructure. This scheduler makes it possible to thread the various software tasks ("thread" according to the AADL standard) in time by taking into account their duration of execution by the processor. In this way, a new task is simulated by the processor only when the preceding task is completed. When the tasks are simulated in the scheduler in the time that is allowed to them, the real-time constraints then are verified.

This solution, however, has the drawback that the real-time analysis is performed only at the execution processor, without taking into account any possible congestion of other hardware components.

In fact, at the scheduler associated with the processor, a predefined execution duration is allocated according to the task to be simulated, for example six clock cycles for a memory access. One is not concerned, for example, with knowing whether, at the moment of this access, the memory is occupied with other concurrent accesses, which is frequent for shared memories in multiprocessor architectures. In such a case, the duration for execution of the access would be extended.

This invention is intended to overcome this drawback in order to improve the real-time analysis by simulation of a computer system by taking into account the allocation of several resources of different nature, such as the CPU, the memory, the bus and the other means of communication.

With this in mind, the invention applies in particular to a method for simulation of a computer system comprising a hardware infrastructure and a software portion executed on the said hardware infrastructure, the method comprising:
a step of modeling the said hardware infrastructure in a plurality of schedulers capable of simulating the successive execution of tasks,
a step of modeling the said software portion in a plurality of initial tasks comprising accesses to resources of the said hardware infrastructure,
a step of simulating the initial tasks, the step comprising the software propagation of simulated accesses through schedulers of the said modeled infrastructure,
and in which the said propagation is carried out in the form of transactions between pairs of schedulers, a transaction comprising a task on each of the schedulers of the pair and an indication of precedence linking the two tasks.

According to the invention, each resource studied is modeled by a scheduler. These schedulers make it possible to model the sequence of the transactions between the initial requestor (task modeled initially) and the resources to be accessed.

The initial tasks correspond to the tasks modeling a function of the software application (portion) of the computer system.

The transactions are seen by the schedulers as simple tasks to be simulated, which makes it possible to retain the standard mechanisms for simulation by scheduler and, therefore, to model the sharing of the resource. The indication of precedence between the tasks, however, makes it possible to store in memory the propagation of the initial request for access to a resource in order, in fine, to link the simulation of this access to the initial task.

By virtue of the invention, the simulation of an initial task is closer to reality, since from then on it takes into account the state of simulation of several resources of the architecture.

At each scheduler (i.e. corresponding hardware resource), it also is possible to conduct an analysis of the activity undergone and to determine more precisely the proportioning necessary for each component of the hardware architecture so as to ensure the real-time execution of the software portion.

The real-time analysis of the computer system then is greatly improved, and the components (resources) of the hardware architecture that it is preferable to modify in order to satisfy the real-time constraints of the simulation models can be easily identified.

In one embodiment, during simulation, a task on the scheduler receiving a transaction determines a modeled time for processing of the corresponding access at the said scheduler and, with the aid of the said indication of precedence, returns the said determined time to the corresponding task on the scheduler transmitting the transaction. By virtue of the propagation mechanism, the times modeled on each of the resources necessary for an access may be taken into account.

In particular, the propagation comprises a chain of transactions linking an initial scheduler, generally a CPU scheduler, simulating an initial task and a scheduler corresponding to the resource to be accessed, and the said times modeled at each scheduler of the chain are returned to the said initial scheduler with the aid of the indications of precedence. In fine, the modeled time for the initial task is different from or uncorrelated with the specific time for execution of this task on the initial scheduler.

In one embodiment, the said tasks of a transaction are generated according to a predefined nomenclature and the said indications of precedence are predefined in accordance with the said nomenclature. The process according to the invention thus involves only the creation of new tasks to define the transactions, the indications of precedence actually being attached automatically to the created tasks as soon as they are created in accordance with the predefined nomenclature. In this way, management of the transactions is simplified and does not require any modification of the existing Cheddar- and AADL-type simulators.

In one embodiment, a scheduler of a resource, transmitter of a transaction, postpones simulation of execution of following tasks, to the end of simulation of the task of the transaction by the receiving scheduler. The transaction can end only when a response is obtained. In terms of tasks, it is the end of simulation of the task at the receiving scheduler that activates the end of the transaction.

The set of transactions received by a scheduler is seen as a set of tasks classified with priorities according to a FIFO method, for example. This furthermore makes it possible to implement different scheduling policies on the schedulers.

In one embodiment, the schedulers are interconnected so as to reproduce the topology of the hardware infrastructure. This arrangement ensures a simulation in keeping with the real performance of the hardware infrastructure.

The AADL simulation language makes a generic scheduler available. This is used in several instantiations that are defined differently, in order to model the different types of resources. In this way, according to one characteristic of the invention, the said schedulers model resources chosen from among the set comprising a central processing unit, a communication bus, a memory, an input/output interface and an external communication network. In that way, the main hardware components of the infrastructure likely to constitute the zones congested with requests, and therefore likely not to adhere to the real-time constraints, are modeled.

In one embodiment, the said schedulers are capable of providing at least one information item representative of the simulated processing function for the corresponding resource. This may be in particular a diagram representing the execution of tasks in simulated time, but also an indicator representative of adherence or non-adherence to real-time constraints. By virtue of this information, it becomes easy for the designer of the infrastructure to have the latter evolve in order to ensure a normal software execution on the hardware infrastructure, in particular by having the resources whose associated function information does not satisfy the real-time constraints, evolve.

According to one characteristic of the invention, the said computer system is a system executing an aeronautical simulation application, and the said hardware infrastructure and software portion are modeled by means of the MDL description language. The AADL language is in fact capable of describing models that can be scheduled, while being extremely well adapted for the simulation of on-board architectures.

In one embodiment, the said initial tasks comprise parameters indicating at least one access to a resource (in particular the set of accesses to the various resources), and the said transactions from a scheduler simulating the said initial task are generated according to the said indicated accesses (therefore parameters).

In particular, the scheduler simulating the said initial task is a scheduler corresponding to a central processing unit of the hardware infrastructure. This configuration is in effect representative of reality, since the simulation models are executed on the central processing unit. The requests for access to the other resources by these simulation models then are propagated from the central processing unit (CPU) scheduler to the other hardware resources schedulers, such as occurs in a standard hardware infrastructure: transmission from the CPU to a memory by going through a bus, for example.

According to a specific characteristic, the said modeled hardware infrastructure comprises a plurality of central processing units, and transaction chains are generated initially at the schedulers corresponding to the said central processing units. Considering the number and the size of the simulation models to be executed, the hardware architecture of the simulation host generally is multiprocessors. In this configuration of the invention, the requests for access are propagated from the schedulers of processors to the schedulers of the other resources.

Correlatively, the invention also applies to a system for simulation of a hardware infrastructure coupled with a software portion executed on the said hardware infrastructure, comprising:

a means for modeling of the said hardware infrastructure in a plurality of schedulers capable of simulating the successive execution of tasks, a means for modeling of the said software portion in a plurality of initial tasks comprising accesses to resources of the said hardware infrastructure, a software means for simulation of initial tasks, capable of propagating simulated accesses through schedulers of the said modeled infrastructure, the said propagation being carried out in the form of transactions between pairs of schedulers, a transaction comprising a task on each of the separate schedulers of the pair and an indication of precedence connecting the two tasks.

In one embodiment, the said schedulers comprise a module for management of transactions capable of adding a determined simulation time to a parameter of a transaction task, and of modifying the status of the transaction task in order to activate, via the indication of precedence, the associated task in the transaction.

Optionally, the system may comprise means relating to the characteristics of the simulation method set forth above.

Other features and advantages of the invention also will become apparent in the description below, illustrated by the attached drawings, in which.

Figure 1:
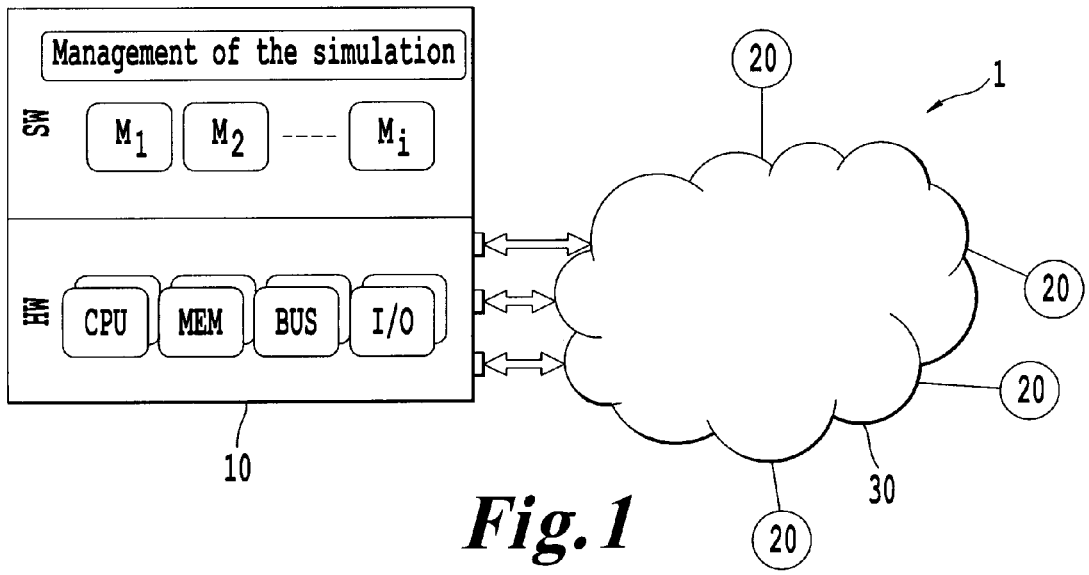
FIG. 1 shows a simulation system for the aeronautical simulation application.

On FIG. 1, an on-board aircraft system simulator 1 comprises:
 a simulation unit 10, also called "host," for simulating a set of equipment items of the on-board system,
 a set of real on-board equipment items 20
 and a network 30, for example of AFDX ("Avionics Full DupleX switched Ethernet") type, linking the host 10 to the real equipment items 20.

Simulation unit 10 is a computer platform composed of a hardware portion HW and a software portion SW.

The latter (SW) brings together a basic software program running the simulation and various simulation models Mi simulating each of the functions of a corresponding equipment item, for example a model for automatic pilot, a model for manual flight controls, etc. The basic software provides the software environment allowing execution of the models Mi.

In host 10, the models Mi are defined by a list of tasks to be executed on a processor of the hardware architecture. The set of tasks Ti making up the software portion SW has been shown on FIG. 2.

A priority as well as an allowed time for execution in order to satisfy real-time constraints is associated with each listed task. In standard manner, the processor has a prioritizing algorithm for carrying out the execution of the set of tasks for which it is responsible, in an optimized way according to the associated priorities.

Performance measurements for the execution of these tasks are carried out during simulations on host 10, in order to verify satisfaction of the allowed times. These measurements also make it possible to determine the cost of execution (generally a time or time brackets) of each task in a processor resource.

Thus for the system to be simulated there is a set of tasks with each of which there are associated:

the processor on which it is executed (in the case of a multiprocessor hardware architecture);
a priority;
the cost of execution on the processor (a length of time);
an allowed time;
a period (the use of which is explained below in connection with the specific parameters of the tasks).

When the models MI are executed on the infrastructure HW, they generate messages for communication to other models Mi and/or to real equipment items 20 via the network 30. Vice versa, they receive messages transmitted by other models Mi and by real equipment items 20.

Figure 2A:
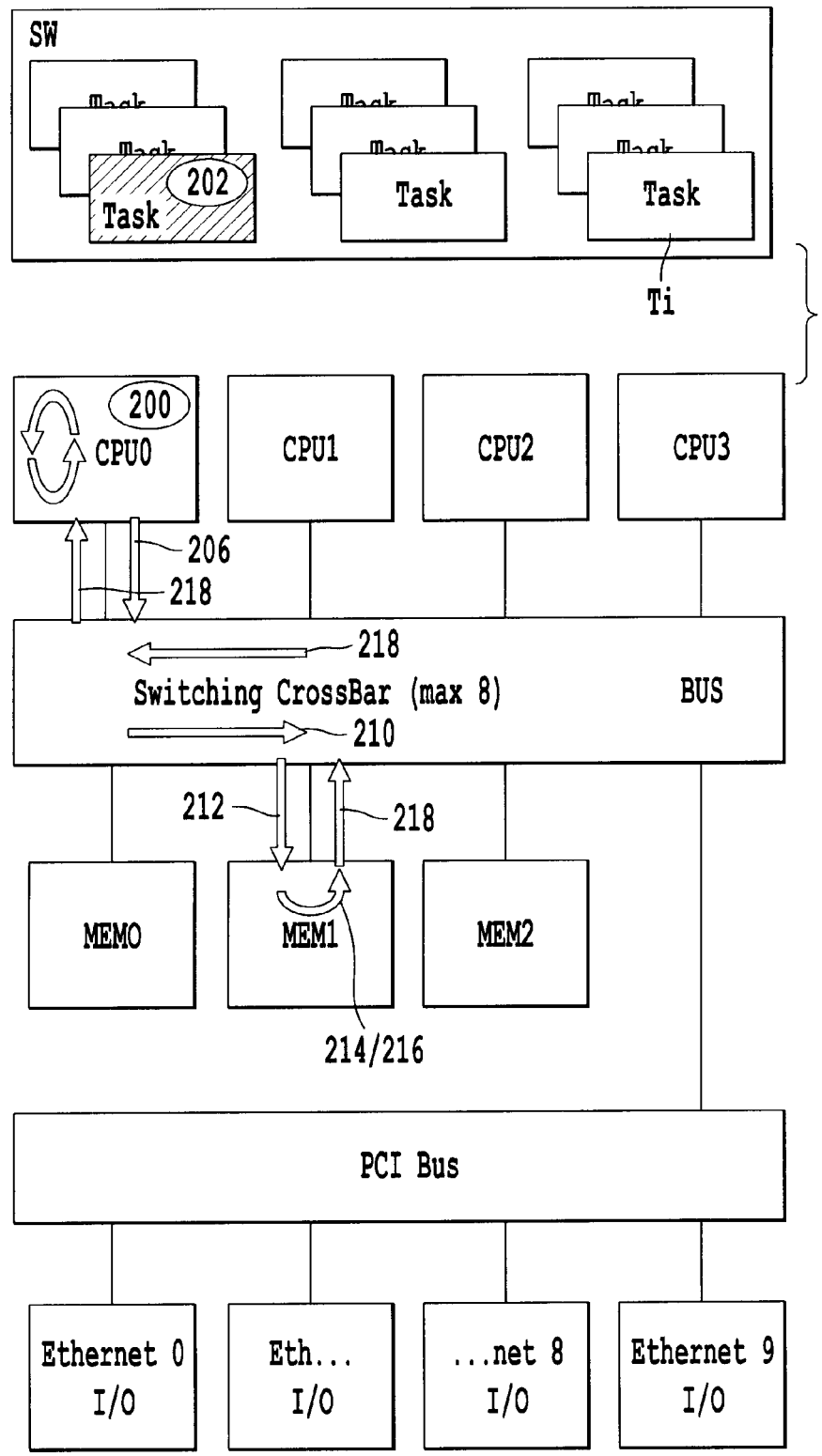
FIGS. 2a and 2b illustrate the modeling of the simulation system of FIG. 1 and an implementation of the method according to the invention.

As shown on FIG. 2a, the hardware infrastructure HW of a simulation host comprises several processors CPU, memories MEM, input/output interfaces I/O in particular with network 30 and buses BUS linking these various components. The hardware topology specifies how these various components are physically linked to each other.

Several different hardware architectures may be contemplated, without departing from the scope of this invention.

For the description below, it will be considered that the bus PCI and an Ethernet access form a single I/O interface. It is possible, however, to distinguish two separate components and to apply the invention separately to these two components so as to obtain performance measurements on a greater number of hardware components.

During developments by simulation, a simulation model Mi is replaced by the corresponding real equipment item 20 in the simulator 1, as needed, as the development of the on-board system advances or according to specific tests. A reverse replacement also may be made according to the real equipment items that are wished to be simulated.

This invention is illustrated in the context of the development of a new hardware infrastructure HW for the simulator 10, taking up the components listed above.

According to the invention, a simulation is made of both the software and hardware architectures that make up the simulator 10, so as to obtain an estimation of the activity of the simulated hardware components for the execution of the likewise simulated software programs. In the embodiment detailed here, the description language AADL and an AADL simulator such as Cheddar, a multi-platform, open-source software developed by the University of Brest, are used.

The Cheddar software is an AADL simulation tool making it possible to calculate various performance criteria such as time constraints. It may be defined with the aid of configuration files in AADL or XML language.

This software relies overall on AADL schedulers representing the processor executing a plurality of tasks. These schedulers have prioritizing and scheduling algorithms, for example Rate Monotonic (RM) or Earliest Deadline First (EDF), so as to execute the tasks in a reproducible order. The schedulers make it possible to model the activity of the component that they represent, by sequencing, in time, the execution of successive requests for access that the corresponding resource is able to process.

The software also is capable of processing precedence constraints linking two configured tasks, by requiring the linked task to be activated at the end of execution of the linking task. These constraints may be defined in the AADL language in order to specify that the first task must be executed before.

Figure 3:
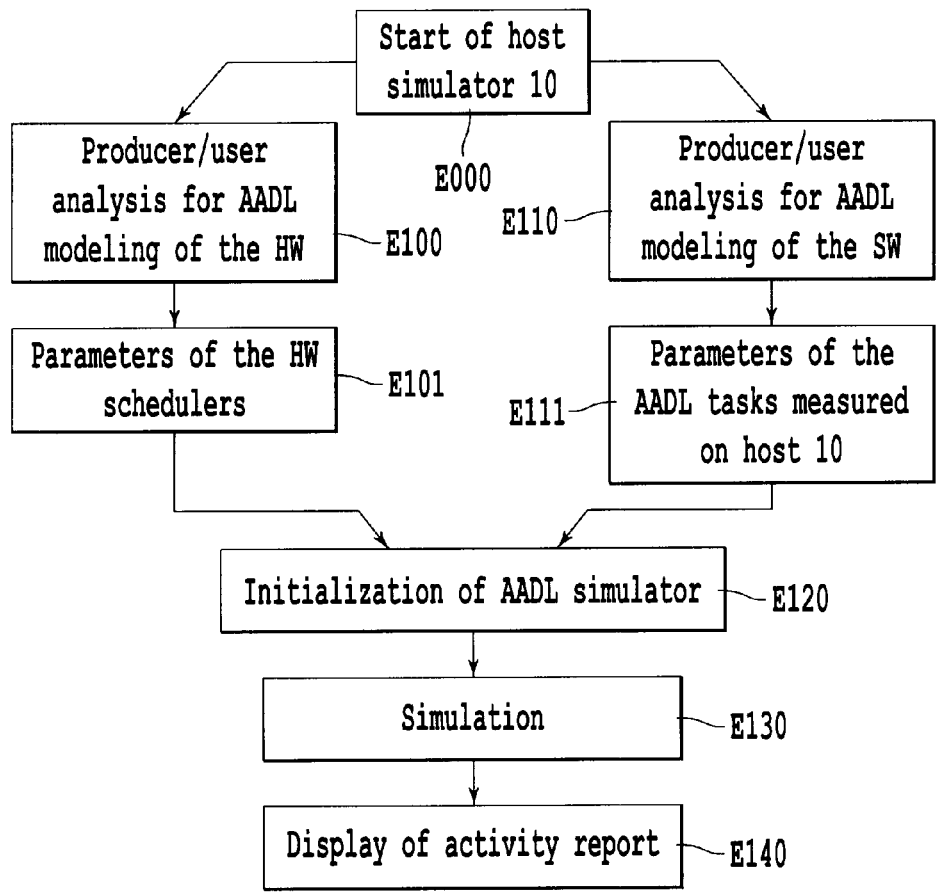
FIG. 3 shows, in the form of a flow chart, steps in the method according to the invention.
Figure 2B:
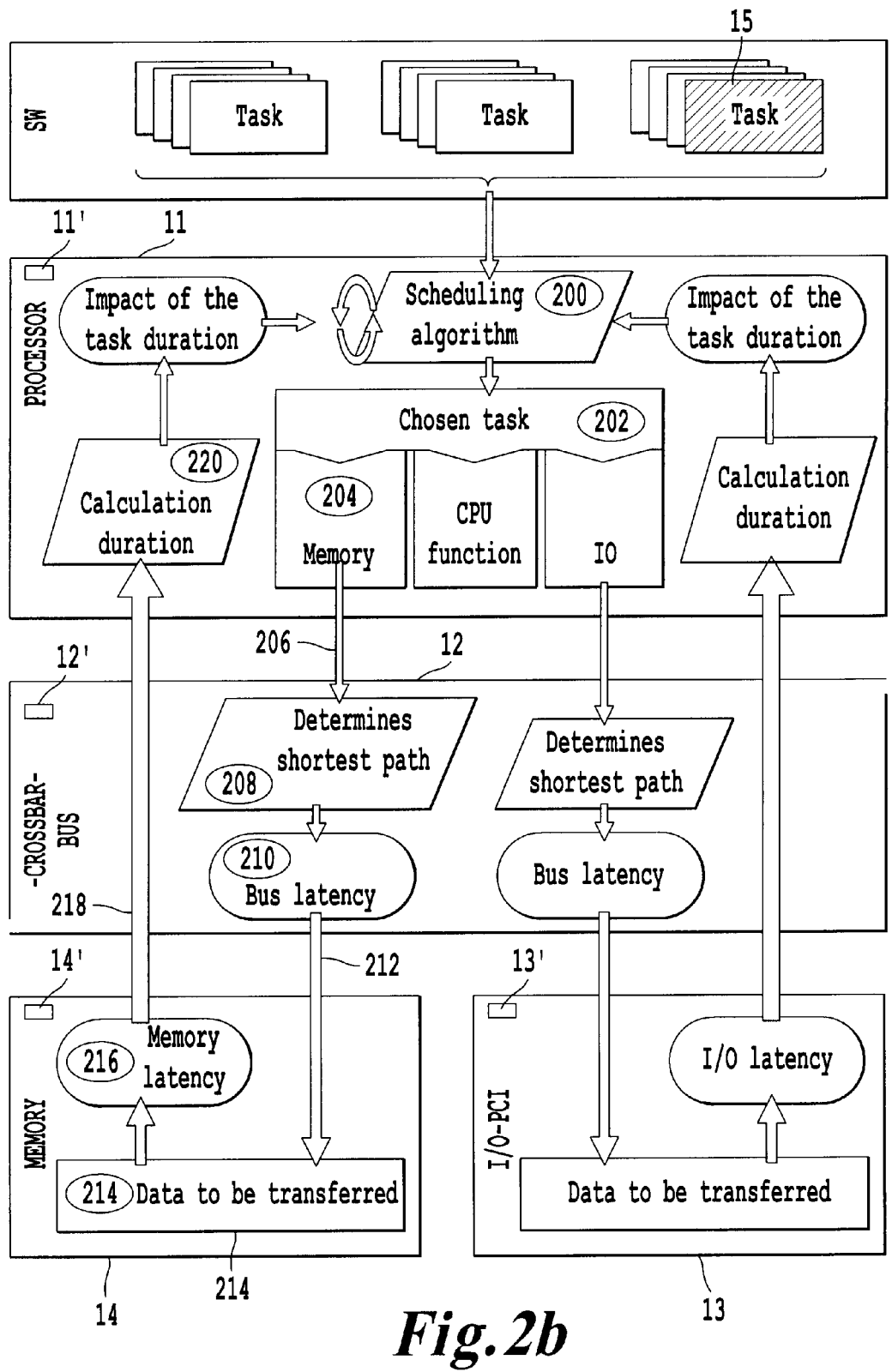

In order to undertake the simulation according to the invention, with reference to FIG. 3, in a first step E100 the hardware portion HW of host 10 is modeled. FIG. 2b illustrates some modeled components.

Unlike the standard use of the Cheddar software, several components of the hardware architecture, and not the processors CPU alone, are modeled here by means of schedulers.

It is endeavored to model, through an AADL object equipped with a scheduler, each of the resources of interest, in particular those subject to congestion because of processing functions to be carried out on host 10. Any resource which, over time, must share its service, thus is likely to be of interest. This is particularly the case for the communication buses.

In fact, each component in a computer provides resources and/or requires them. It interacts by means of transactions transmitted either directly or via buses. The buses, as well as the other multi-interfaced components, must be capable of managing concurrent accesses, prioritizing a request in relation to another one, retaining the requests put on hold, etc. In the end, the performance of the bus may be likened to a component provided with a scheduling algorithm that produces and uses transactions from the peripherals and processor of the computer.

As will be seen subsequently, the method proposed by the invention consists "in seeing" the topology of the computer infrastructure HW as a series of resources that are produced and used by the tasks. These tasks are transactions (two tasks and a link). This makes it possible to place the simulation of the hardware and the software on the same AADL level.

Symmetrically, the software portion to be modeled in this step already consists of a set of models Mi. Here, one is led to model the said Mi models in the form of user/producer task.

Thus, on FIG. 2b, there has been shown a scheduler 11 corresponding to the processor CPU0, a scheduler 12 corresponding to the bus BUS, a scheduler 13 corresponding to an interface I/O and a scheduler 14 corresponding to a memory MEM0. In general, it is sought to model the set of processors, memories, buses, input/output interfaces, and any other resource of interest.

Each scheduler 11-14 has a prioritizing algorithm such as referred to above, to properly carry out the simulation of the tasks that it is led to process.

Other processing algorithms provided for in the controllers of the hardware components also are reproduced in the schedulers so as to ensure a similar performance between these schedulers and the corresponding hardware architecture. By way of example, there has been shown on the Figure at bus scheduler 12, a module 120 for determining a shortest path to the memory, because the corresponding bus hardware matrix has a similar algorithm.

The processing according to the invention is continued with step E101 during which the associated processing costs are specified for each scheduler: for example, at a memory scheduler, the number of time brackets to be counted for a memory access; at a bus scheduler, the number of time brackets to be counted for a transfer on the bus, etc.

These data may be obtained directly from the resource manufacturers, or through measurements on the real simulator 10.

Concurrently with steps E100 and E101, or following the latter, one proceeds to step E110 during which the software portion SW of host 10 is modeled. Since it is sought to evaluate the performances of the hardware infrastructure HW irrespective of the software configuration chosen (that is to say the models Mi used), the entirety of the simulation models Mi, corresponding to a total simulation of the real equipment items, is taken into account here.

As described above, a list of tasks Ti corresponding to the models Mi is available. This step E110, that may include the generation of this list, is intended to convert these information items into the AADL language, if need be automatically.

Figure 4A:
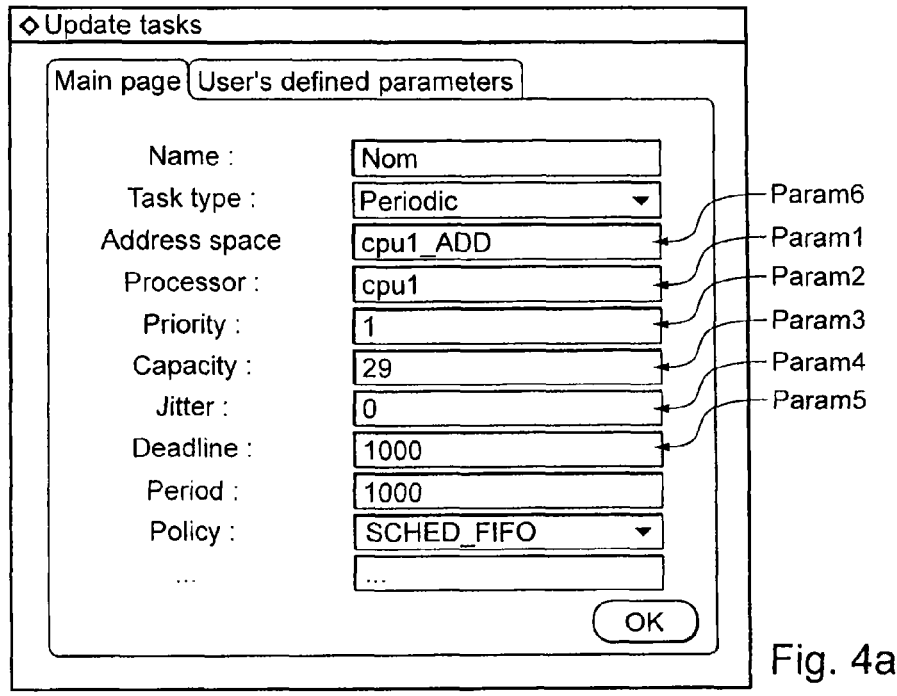
FIGS. 4a and 4b show a software interface displaying various parameters defining a task modeling the software portion of the system of FIG. 1.
Figure 4B:
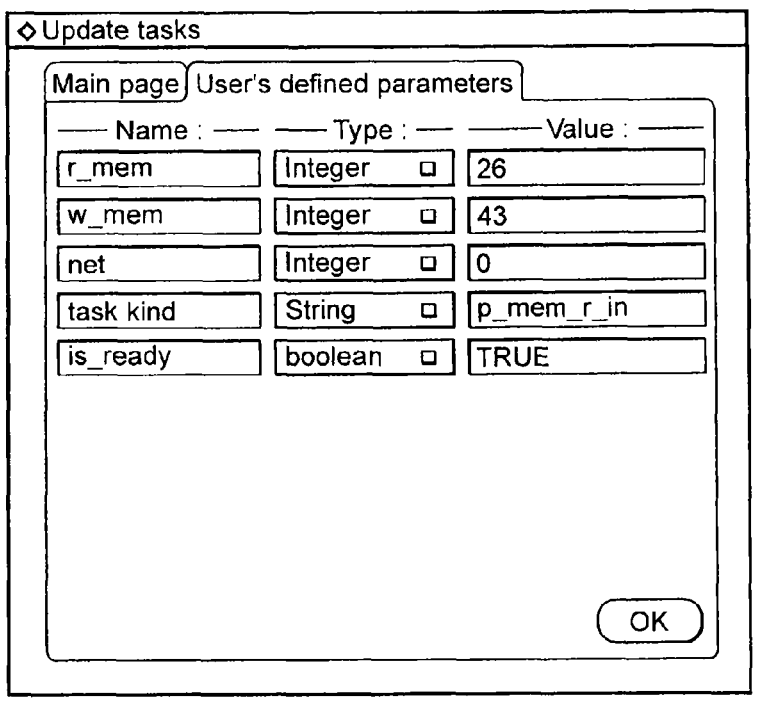

Each task Ti is converted into an AADL task 15. FIGS. 4a and 4b show a user interface indicating a task 15, executed on the processor "cpu1," with a priority of 1. This conversion is carried out by manual data entry on the interface or by importing parametrization files.

As shown on FIG. 4a, the other parameters of task 15 are indicated: execution processor (Param1), priority (Param2), cost (Param3), allowed time (Param4) and period (Param5). The memory space (Param6) associated with the execution processor also is indicated. In practice, each processor has a sole memory space. In the case of distributed simulation, however, distributed memory spaces may be provided.

These information items are predominantly standard and allow the AADL simulator, in the known solutions, to evaluate the performances of each of the processors for the execution of these various tasks.

In step E111, additional information items are indicated at tasks 15. As shown on FIG. 4b, specific parameters are indicated at the user parameters ("user's defined parameters") of the AADL simulator.

Through these parameters there are defined, for each task, the operations involving other components of the hardware architecture, in particular the other components modeled during step E100. According to the invention, these information items are going to make it possible to take into account the simulated execution of these "other" operations in the cost of execution of the current task.

In non-limitative manner, the specific parameters include:
r_mem [integer]: the number of variables read in memory per period
w_mem [integer]: the number of variables written in shared memory per period
net [integer]: the number of bytes transferred on the network per period These information items are collected, with software probes, during execution of the simulation application SW in real simulation unit 10. They then are recopied in the initialization parameters for the object tasks modeling the aeronautical simulation application SW.

Certain parameters of FIG. 4a also are determined according to this method—this is the case of capacity (param3)—and are added to the AADL tasks during this step E111.

As a reminder, the other parameters are derived directly from the models Mi during step E110.

It is seen here that the period information makes it possible to relate the specific parameters indicated to an analysis time period. The simulation therefore functions at a simulation pace that synchronizes all the objects among themselves. This simulation pace is chosen to represent a time quantum of 10 µs (defining a time bracket). And all the times thus are rounded to within 10 microseconds. In this way, the periods and allowed times referred to above are indicated in simulation pace numbers.

There are provided as many versions of these parameters as there are components in the hardware topology. In our example of FIG. 2a, there are three memories MEM0 to MEM2. Therefore three parameters r_mem0, r_mem1, r_mem2 are provided to indicate respectively the numbers of variables read in each of the corresponding memories. The same is true for w_mem and for net which depends on the number of I/O interfaces on a network.

As will be seen subsequently, these specific parameters make it possible, during the simulation, to create requests for access to the other hardware components, in the form of transactions. In this way, by successive creations, propagation of the tasks in the simulated architecture is achieved, in order to evaluate their own simulated execution time.

Other specific parameters are used for the simulation strictly speaking:
- task_kind [character string] which defines the type of task used in order to apply the appropriate environment for simulation of the task;
- is_ready [Boolean] which defines the state of the "activated" or "disabled" task, a parameter of the simulation.

Processing is continued at step E120 by initialization of the AADL simulation software so that it can carry out propagation of the AADL simulation tasks 15 in the simulated architecture.

During this step, the possible AADL description files for the software and hardware portions are imported.

In order to successfully carry through the propagation of the tasks, each scheduler 11-14 comprises, in addition to prioritization and scheduling modules, a transaction management module 11'-14'.

According to the invention, when a task 15 is simulated by a scheduler 11-14, the associated transaction management module 11'-14' determines the operations involving other schedulers (in concrete terms by reading the specific parameters r_mem, w_mem and net). For each of these operations, it creates a transaction with the next scheduler involved according to the topology. For example, for a reading memory access, the scheduler following the one (11) of the processor CPU0 is the scheduler 12 of the bus, since in the corresponding hardware architecture, it is a matter of transferring the request to the memory MEM via the bus BUS.

The module for management of the transactions also is configured for activating and disabling the tasks as described subsequently.

As will be illustrated subsequently, the transactions 50 are composed of a task 40, 40' on each of the two schedulers involved in the transaction and of a precedence link 40'' linking these two tasks (see FIG. 5).

In this way, a transaction management module creates a task 40, 40' either because the corresponding scheduler is simulating a task 15, 40, 40' at least one of the fields r_mem, w_mem and net of which is indicated with a non-zero value, or because it is receiving a transaction request from another scheduler.

In our example of FIG. 2, the processor CPU0 is capable of processing tasks not involving itself, or involving memory (write or read) accesses and I/O accesses. The transaction management module 11' thus can create the following tasks:
- P0_BUS_MEM_r out to indicate a request to the bus BUS for a read memory access;
- P0_BUS_MEM_r in to indicate a response from the bus BUS to a read memory access;
- P0_BUS_MEM_w_out and P0_BUS_MEM_w in are similar for a write memory access;
- P0_BUS_IO_out and P0_BUS_IO_in are similar for an I/O access.

P0 indicates the processor CPU0. The indications "P0," "MEM," "BUS," etc. vary according to the intended schedulers in the architecture (several processors Pi, several memories MEMi, etc.).

By way of example, a task 40 for reading in memory, intended for the BUS scheduler 12, is set forth in detail:
Name: P0_BUS_MEM_r_out
Period: 1
Capacity: 1
Deadline: 10000
Priority: 1
task_kind: bus_mem_r_out
is_ready: TRUE The label task_kind here makes it possible to initialize the parameters of the task so as to ensure that the environment at the start of simulation is correct, and to identify the type of task 40 being executed on the CPU (a pre-established nomenclature is used). The parameter is_ready makes it possible to manage the state of the task 40: activated or disabled, that it to say, as long as this task 40 is activated, CPU scheduler 11 does not proceed to a following task.

Likewise, the transaction management module 12' has tasks 40, 40' listed in the table below. As the bus is a central component, the tasks involve both the processors Pi and the various peripherals MEM, IO, etc.

| Name of the task | task kind |
| --- | --- |
| BUS_Pi_MEM_r_in | p_mem_r_in |
| BUS_Pi_MEM_r_out | p_mem_r_out |
| BUS_Pi_MEM_w_in | p_mem_w_in |
| BUS_Pi_MEM_w_out | p_mem_w_out |
| BUS_Pi_IO_in | p_io_in |
| BUS_Pi_IO_out | p_io_out |
| BUS_MEM_r_Pi_in | mem_r_in |
| BUS_MEM_r_Pi_out | mem_r_out |
| BUS_MEM_w_Pi_in | mem_w_in |
| BUS_MEM_w_Pi_out | mem_w_out |
| BUS_IO_Pi_in | io_in |
| BUS_IO_Pi_out | io_out |

By way of example, task 40' of transaction 50 involving the task 40 explained above is the following:
Name: BUS_P0_MEM_r_in
Period: 1
Capacity: 1
Deadline: 10000
Priority: 1
task kind: p_mem_r_in
is_ready: TRUE Likewise, for management module 14' there are the following tasks 40, 40':

| Name of the task | task kind |
| --- | --- |
| MEM_r_BUS_Pi_in | r_in |
| MEM_r_BUS_Pi_out | r_out |
| MEM_w_BUS_Pi_in | w_in |
| MEM_w_BUS_Pi_ou | w_out | and for management module 13':

| Name of the task | task kind |
| --- | --- |
| IO_BUS_Pi_in | in |
| IO_BUS_Pi_out | out |

These tables, of course, may be offered in as many versions as there are resources concerned.

Still during step E120 for initialization of the AADL simulator, a file (DECLA) is imported to link the tasks created above so as to form transactions. This file lists a set of precedence links in the AADL sense relying on the nomenclature for the tasks used above.

Still with reference to the two tasks 40 and 40' explained above, the following declaration is provided:

<dependency>P0_BUS_MEM_r_out
BUS_P0_MEM_r_in</dependency>.

The series P0_BUS_MEM_r_out+<dependency>+ BUS_P0_MEM_r_in thus constitutes a transaction, and in this particular example a request for bus access with a view to a reading in memory.

Once the AADL simulator is configured, step E130 for simulation strictly speaking is undertaken, involving the simulation of tasks 15 and their propagation by transactions through various schedulers.

With reference to FIGS. 2a and 2b, the simulation begins at step E200 with execution of the algorithm for scheduling and prioritization of the CPU schedulers (here scheduler 11). The execution of a task and its propagation with the aid of a processor CPU0 for a read memory access is illustrated below. The same mechanisms are used for the other processors and for other tasks, either local at the processors or requiring transactions with other schedulers. The schedulers thus receive numerous tasks from several sources.

The prioritization algorithm determines, from among the set of active tasks to be processed, a first task 15 to be simulated during step E202.

At step E204, scheduler 11 of processor CPU0 determines the nature of the task to be performed in particular if the fields r_mem, w_mem and net are indicated. In an example, the field r_mem contains the value 1 because it is desired to access a datum in memory MEM.

At step E206, a transaction 50 then is created between scheduler 11 executing task 15 and scheduler 12 of the bus, necessary for accessing memory MEM.

Figure 5:
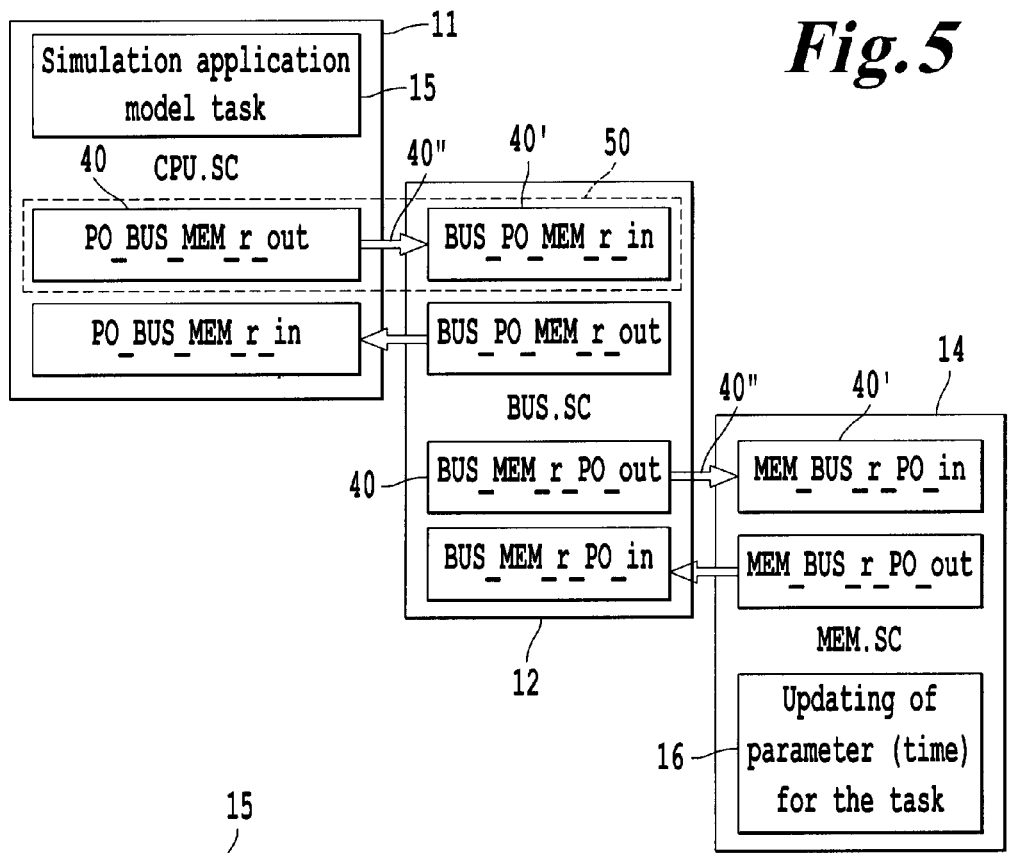
FIG. 5 illustrates, through an exemplary access to a memory, transactions and precedence links implemented in this invention.

This creation is illustrated by FIG. 5, in which, on scheduler 11 of the CPU, transaction management module 11' creates a user task 40 "P0_BUS_MEM_r_out," and on scheduler 12 of the BUS, module 12' creates a corresponding producer task 40' "BUS_P0_MEM_r_in."

By virtue of the precedence declaration file DECLA, the AADL simulator then automatically links these two tasks 40, 40' by a precedence link 40".

It is noted here that there are created as many transactions as there are intended operations in the fields r_mem, w_mem and net (a field equal to 'n' generates n transactions), the associated tasks corresponding to the actions to be carried out (writing or reading in memory, I/O access).

Since the processing of the initial task 15 from then on is deported on the bus, the parameter "is ready" is set at TRUE for producer task 40' so that the following scheduler takes it into account and simulates it when the scheduling algorithm deems it eligible. On the other hand, user task 40 has an "is_ready" parameter set at FALSE, the task awaiting the end of transaction.

This step E206 thus corresponds to a start of propagation of the request for memory access in the architecture.

At step E208, the algorithms specific to the network topology (here module 120 of the bus controller) are executed. In this way the shortest path for accessing the memory is determined. In the example of FIG. 2, the bus is directly linked to the memory: the shortest path therefore is trivial.

At step E210, scheduler 12 determines the latency associated with the execution of task 40', that is to say the cost linked to the processing of the request for memory access via the bus.

For that, scheduler 12 successively simulates the various tasks that it receives according to corresponding priorities and the associated prioritization algorithm. When scheduler 12 finally simulates the received task 40', it determines the period of time elapsed since reception thereof (waiting time on the bus, for example counted in unitary time brackets).

A cost linked to the physical transfer on the bus may be added to this period of time. This cost is either fixed, or calculated according to the complexity of the bus and the actions carried out thereon in order to transfer the data to the memory. For example, for a crossbar bus, a penalty of 25 nanoseconds is added per jump (hop) from one crossbar to the other. The value obtained then is rounded to within 10 microseconds to obtain a whole number of time brackets.

The total cost of processing by the bus Cbus then is stored in the memory of scheduler 12, for this producer task 40'.

Since in our example task 15 concerns a memory access, at step E212 the scheduler 12 again propagates the request to memory MEM (according to the shortest determined path, which sometimes can require transferring via other schedulers), with the aid of a new transaction 50.

This propagation decision is derived, by scheduler 12, from the parameter "task kind" being equivalent to 'p_mem_r_in.' The latter here indicates that a reading memory access is to be carried out. The name of the target memory is derived from the name "BUS_P0_MEM_r_in" of task 40' (here indicating MEM).

Similar to what was set forth above, a new user task 40 "BUS_MEM_r_P0_out" is created by module 12' on the BUS scheduler, and the corresponding producer task 40' "MEM_r_BUS_P0_in" (activated task) is created on scheduler 14 of memory MEM.

Precedence link 40" is automatically associated with the two tasks so created, on the basis of the declarations file DECLA.

The calculated cost Cbus is passed to a parameter of newly created user task 40. By virtue of the precedence link, producer task 40' at the memory will be able to retrieve this information.

The parameter "is_ready" of task "BUS_P0_MEM_r_in" at the origin of this new transaction then is set at FALSE, by the transactions management module 12', to indicate that the processing is deported on the following resource (here the memory). Transaction 50 between the CPU and the BUS then comes to an end. Scheduler 12 again is available to process a following task.

At step E214, scheduler 14 detects the activation of producer task 40' "MEM_r_BUS_P0_in" by virtue of the parameter "is_ready." It then takes it into account in order to determine the next task to be simulated, by virtue of the prioritization algorithm (tasks to be processed by this memory may originate from several buses and CPUs).

When the said task 40' of reading in memory is chosen and simulated, it first of all retrieves the time Cbus passed to a parameter of the task 40 that is linked thereto.

A waiting time, between the moment when the task became eligible for scheduler 14 and the moment when it was chosen, then is determined. This time corresponds to a number of time brackets corresponding to the number of tasks processed in the meantime by the scheduler.

During step E216, a latency time resulting from the actual processing of the reading of a datum at the memory is added to this waiting time. This latency time corresponds to the access time, and may be a fixed cost, for example 100 nanoseconds per access to a memory block, or a variable cost calculated from more complex models. In this way the cost Cmem of processing by the memory is obtained.

It may be noted here that, in the case of a scheduler with input/output I/O interface on a network, a latency cost equal to 'quantity of data to be transferred/pass band of the network' is calculated and used to determine the cost Cio.

At step E218, propagation of the request for reading in memory comes to an end and the associated processing costs (latency, etc.), for task 15, at each of the schedulers 12, 14 are returned to scheduler 11 of the processor.

This return transmission is accomplished by a return propagation in the form of transactions 50 and is implemented in the following manner.

During simulation of the producer task 40' "MEM_r_BUS_P0_in" (step E216), a corresponding task "MEM_r_BUS_P0_out" 40 is created at scheduler 14 (see FIG. 5) in which the set of costs retrieved by task 40', here Cbus, are passed to parameters, and the calculated cost, here Cmem, to local.

From this task 40, a transaction 50 is created with the BUS, during step E218.

At scheduler 12 of the BUS, the task "BUS_MEM_r_P0_in" retrieves these various costs (Cmem, Cbus, Cio), by virtue of the precedence link. A new transaction 50 then is carried out (still step E218) between the BUS and the CPU in order to bring these information items back to the CPU.

This return propagation is carried out according to the same mechanisms as the propagation going from the CPU to the memory MEM. In particular, the parameter "is_ready" is used to propagate the transactions between the various schedulers. Scheduler 14, in particular, then becomes available again for processing a following task.

According to the modeling used for each of the resources, an additional cost at the time of the return propagation may or may not be taken into account at each of the schedulers traversed.

For example, for a bus modeling working in time multiplexing (TDMA), the associated bus controller may consider the outgoing path and the return path as two independent requests. A different cost for each path then may be calculated in the context of this invention.

Conversely, the cost calculations carried out at the time of outgoing propagation may include the round-trip costs.

Scheduler 11 then detects that its task 40 "P0_BUS_MEM_r_out" is activated. When the task is simulated, scheduler 11 retrieves the Cmem and Cbus costs.

At step E220 it calculates the cost Ctask linked to the processing of task 15, by:

calculating the processing cost linked to the processor Ccpu, by adding the waiting time for task 15 then a fixed cost linked to the execution of the processor;
then adding Ccpu, Cmem and Cbus.

The simulation of task 15 then comes to an end. One then returns to step E200 during which the scheduling algorithm determines the following task 15 to be simulated.

Back at FIG. 3, at step E140, the processing procedure of the invention provides data or graphics representative of the activity of each scheduler of interest. These information items reproduce, in time, the moments of simulation (100% occupancy of the associated resource) and the moments of non-occupancy of the resource.

Figure 6:
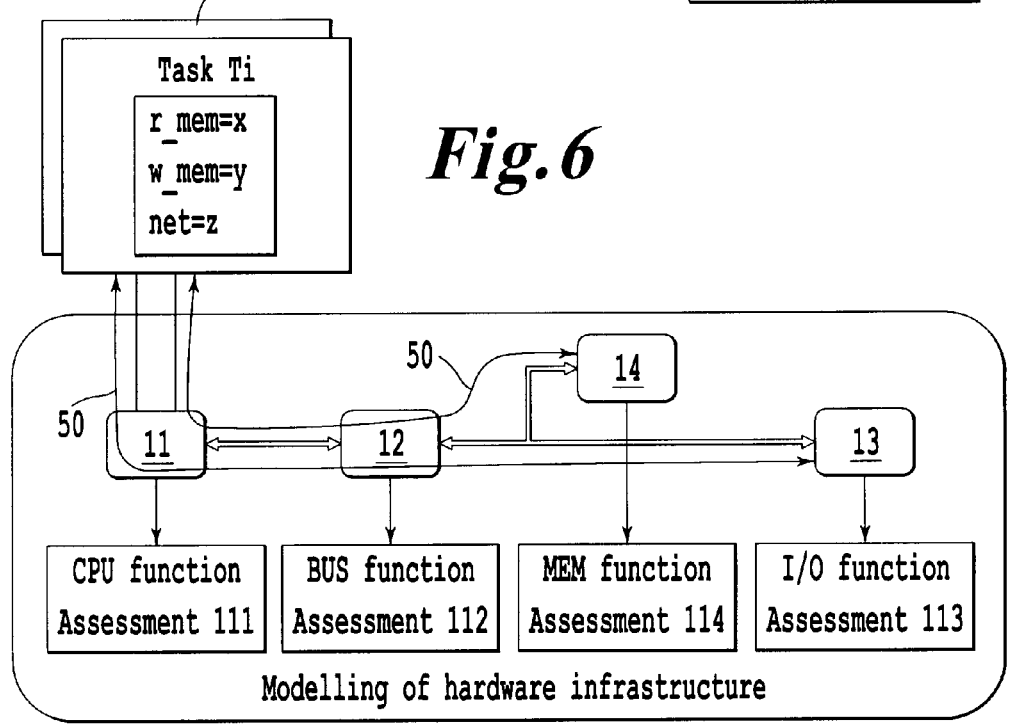
FIG. 6 illustrates the activity reports generated at the modeled resources of an exemplary hardware infrastructure of the system of FIG. 1.

FIG. 6 illustrates this function at each scheduler of the architecture. Each scheduler has contributed to the propagation of one or more requests for access (transactions 50). By virtue of the scheduling of the simulated tasks by each one of them, it is possible to establish graphics reproducing, in a timeframe, the moments of simulation of tasks and the moments of rest.

In this way, graphics 111 of the activity/function of CPU0 are drawn up from the scheduling of the tasks at scheduler 11.

Similarly, function graphics 112, 114, 113 for the buses, the memories, the I/O interfaces, etc. are drawn up from the associated schedulers 12, 14, 13, etc.

From these cost information items for the set of tasks that it is led to process, each scheduler is able to determine whether it is capable of performing the scheduling of these tasks in the allowed times and/or of detecting an overrun.

The total costs Ctask are used at scheduler 11 for assessing whether the corresponding task 15 may be executed in real time by the proposed hardware architecture, which is the case if:

$$Ctask < \text{allowed time}.$$

Non-adherence of this constraint may signify a hyperactivity of at least one component of the hardware architecture. This hyperactivity slows down the processing of the tasks. Indication of non-adherence may be included in the assessment 111 generated by scheduler 11.

Similarly, the sums Cmem+Cbus are used at scheduler 12 for evaluating whether the assigned tasks 40' may be executed in real time by bus BUS. It is understood that for scheduler 12, it is advisable to add all the costs linked to the various transactions of the same task 40' with the cost for processing at the bus.

Also, the costs Cmem (or Cio at the I/O interfaces) are used to evaluate the execution, in real time, of the simulated tasks 40' on this (I/O interface) memory scheduler.

Any task not having satisfied the allowed-time constraint is indicated in the report (111-114) drawn up by each scheduler (11-14).

Figure 7:
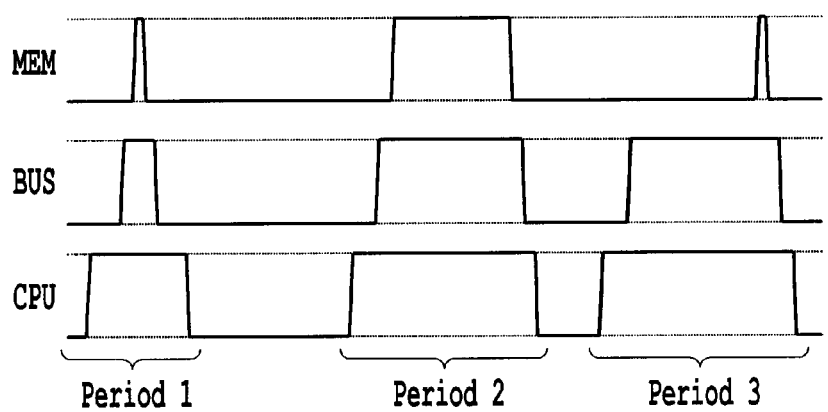
FIG. 7 shows exemplary graphics constituting an activity report according to the invention.

FIG. 7 shows a simplified example of simulated graphics for an architecture made up of a processor, a bus and a memory.

These graphics show the activity of the various components in time, over three different periods for the processing of the same request.

From these graphics, a bottleneck is detected in the architecture.

During illustrated period 1, each of the components is available, the requests being processed almost instantaneously. This portion of the graphics illustrates the performance of a memory access without conflict.

During period 2, it is seen that the time for processing of the task by the CPU is clearly lengthened.

In comparison with period 1, the time for processing by the memory MEM is greatly lengthened. By snowball effect, this lengthening also increases the load on the bus and on the CPU, these being able to complete the request only once the processing by the memory is completed. It therefore is concluded that at the moment of simulation corresponding to this period, the memory MEM is occupied, probably by other requests coming from various components. A bottleneck thus is identified at the memory.

This delay in processing of the task may lead to a non-adherence to the pre-established time constraints at the CPU.

During period 3, the processing time at the CPU also is abnormally lengthened, involving a non-adherence to time constraints.

Here, the report according to the invention makes it possible to establish that the memory is available and is not causing a delay in the processing that is dependent thereon. In fact, the time spent at the memory is more or less equal to that of the normal functioning of period 1.

On the other hand, it is seen that the bus is occupied and has processed the request from the processor of interest to us only after a long delay time. A bottleneck therefore is identified at the bus at the simulation moment corresponding to the start of period 3.

In this way, if time constraints are not adhered to, appropriate solutions are brought to bear on models SW or HW for simulation, for example a re-dimensioning of the faulty hardware resource, or a re-dimensioning of task 15 by cutting it in half, for example. In this way the hardware architecture may be adapted to the software needs in order to develop an adapted architecture.

There has been shown above a simulation in accordance with the invention during which basic tasks constituting a software portion are identified according to their nature (memory, CPU only, input/output interface) then are propagated in the form of transactions, in a simulated hardware architecture so as to analyze the activity load at several points of this architecture. Any activity for simulation of execution of a software program is represented in the producer/user form of the various types of resources. The task at the origin of the transactions, the one that controls the activation of all the others, is the software task that models a real task of the application of simulation host 10.

In this way, the invention combines hardware and software modelings of any computer system in the same environment as well as the means making it possible to effectively represent the flow of information to be processed in the hardware architecture. This combination makes it possible to rapidly evaluate the execution performances of the software applications of the computer system on the hardware infrastructure, and to derive therefrom a hardware design of the infrastructure capable of supporting the execution of the software portion of the computer system.

The foregoing examples are only embodiments of the invention which is not limited thereto.

In particular, it may be provided a task modeling such that at a specific scheduler, a transaction generates several transactions to other schedulers. This may be the case, for example, if a bus receiving a request is to transmit the same request to several memory controllers.

The scheduler then manages the three transactions either successively or simultaneously.

In the latter case, it stores in memory an information item representative of this reduction, for example an identifier. In this way, during return propagation, the same scheduler waits to receive the costs associated with each of these transactions before creating the transaction that will repatriate all of these costs to the upstream scheduler.

The invention claimed is:

1. A method for simulation of a computer system comprising a hardware infrastructure and a software portion executed on said hardware infrastructure, the method comprising:
    modeling said hardware infrastructure using a plurality of schedulers configured to simulate successive execution of tasks;
    modeling said software portion in a plurality of initial tasks including accesses to a plurality of resources of said hardware infrastructure;
    simulating said initial tasks, said simulating including software propagation of simulated accesses through corresponding schedulers of said modeled hardware infrastructure, and in which said software propagation is carried out by transactions between pairs of said corresponding schedulers, each said transaction between respective pairs of said corresponding schedulers including tasks associated with one of said respective pairs of schedulers, and an indication of precedence linking said tasks associated with said one of said respective pairs of schedulers.

2. The method according to claim 1,
wherein, during said simulating, one of said tasks, of a receiving scheduler of said one of said respective pairs of schedulers associated with a corresponding transaction, determines a modeled time for processing of a corresponding access at said receiving scheduler and, with aid of said indication of precedence, returns said determined modeled time to a corresponding task of a scheduler of said plurality of schedulers transmitting the corresponding transaction.

3. The method according to claim 1,
wherein said software propagation includes a chain of said transactions linking an initial scheduler of the chain simulating an initial task of said plurality of tasks and a scheduler of the chain, different from said initial scheduler, corresponding to one of said resources to be accessed, and determined modeled times at each said scheduler of the chain are returned to said initial scheduler with aid of each of said indications of precedence.

4. The method according to claim 1,
wherein said tasks associated with each said transaction are generated according to a predefined nomenclature and each of said indications of precedence is predefined in accordance with said predefined nomenclature.

5. The method according to claim 1,
wherein a scheduler of said plurality of schedulers associated with one of said resources transmits a corresponding transaction, and postpones simulation of execution of tasks following a corresponding one of said initial tasks, to an end of simulation of a task associated with the corresponding transaction by a receiving scheduler.

6. The method according to claim 1,
wherein said schedulers are interconnected so as to reproduce a topology of said hardware infrastructure.

7. The method according to claim 1,
wherein said schedulers model resources selected from among a set comprising a central processing unit, a communication bus, a memory, an input/output interface, and an external communication network.

8. The method according to claim 1,
wherein said schedulers are configured to provide at least one information item representative of a simulated processing function of a corresponding resource of said plurality of resources.

9. The method according to claim 1,
wherein each of said initial tasks includes parameters indicating at least one access to a resource of said plurality of resources, and each of said transactions from a scheduler of said plurality of schedulers simulating a corresponding initial task of said initial tasks generated according to said indicated at least one access.

10. The method according to claim 1,
wherein each of said schedulers of said plurality of schedulers is one of a processor scheduler, a bus scheduler, a memory scheduler, and an interface scheduler.

11. The method according to claim 1,
wherein each of said schedulers of said plurality of schedulers includes a prioritization module, a scheduling module, and a transaction management module.

12. A system for simulation of a hardware infrastructure and a software portion executed on said hardware infrastructure, comprising:
    a first modeling unit to model said hardware infrastructure in a plurality of schedulers configured to simulate successive execution of tasks;
    a second modeling unit to model said software portion in a plurality of initial tasks including accesses to resources of said hardware infrastructure,
    a simulator to simulate said initial tasks and configured to propagate simulated accesses through corresponding schedulers of said modeled hardware infrastructure, said propagation being carried out by transactions between pairs of said corresponding schedulers, each said transaction between respective pairs of said corresponding schedulers including tasks associated with one of said respective pairs of schedulers, and an indication of precedence linking said tasks associated with said one of said respective pairs of schedulers.

13. The system according to claim 12, wherein each said task has associated therewith a processor on which it is executed, a priority, a cost of execution on the processor, an allowed time for execution, and a period.

14. The system according to claim 12, wherein, when one of said tasks is simulated by a corresponding scheduler of said plurality of schedulers, an associated transaction management module determines operations involving one or more additional schedulers of said plurality of schedulers, and for each of the determined operations, the corresponding scheduler creates a transaction with a next scheduler of said plurality of schedulers in a sequence according to a topology of said hardware infrastructure.

\* \* \* \* \*